(12) United States Patent
Miyajima (10) Patent No.: US 8,369,577 B2
(45) Date of Patent: Feb. 5, 2013

(54) VEHICLE POSITION RECOGNITION SYSTEM

(75) Inventor: Takayuki Miyajima, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 228 days.

(21) Appl. No.: 13/018,945

(22) Filed: Feb. 1, 2011

(65) Prior Publication Data
US 2011/0243454 A1  Oct. 6, 2011

(30) Foreign Application Priority Data
Mar. 31, 2010 (JP) .................. 2010-084678

(51) Int. Cl.
*G06K 9/00* (2006.01)
*G08G 1/16* (2006.01)
(52) U.S. Cl. ................. 382/106; 382/291; 340/903
(58) Field of Classification Search .............. 382/100, 382/103–107, 154–156, 162, 168–170, 173, 382/181, 199, 206, 224, 232, 254, 274, 276, 382/286–291, 305, 312; 340/936, 903, 435; 348/148; 701/301
See application file for complete search history.

(56) References Cited

U.S. PATENT DOCUMENTS
| | | | | |
|---|---|---|---|---|
| 7,202,776 B2 * | 4/2007 | Breed | .......................... | 340/435 |
| 8,139,114 B2 * | 3/2012 | Nobori et al. | ................ | 348/148 |
| 8,260,537 B2 * | 9/2012 | Breed | .......................... | 701/301 |
| 8,269,652 B2 * | 9/2012 | Seder et al. | ................... | 340/903 |
| 8,305,236 B2 * | 11/2012 | Mori et al. | .................... | 340/936 |

FOREIGN PATENT DOCUMENTS
| | | |
|---|---|---|
| JP | A-09-152350 | 6/1997 |
| JP | A-11-37776 | 2/1999 |
| JP | A-2000-097713 | 4/2000 |
| JP | A-2002-357437 | 12/2002 |
| JP | A-2004-219332 | 8/2004 |
| JP | A-2005-249654 | 9/2005 |
| JP | A-2007-108139 | 4/2007 |
| JP | A-2008-122230 | 5/2008 |

OTHER PUBLICATIONS

Japanese Patent Office, Notification of Reason(s) for Refusal mailed Jul. 12, 2012 in Japanese Patent Application No. 2010-084678 w/Partial English-language Translation.

* cited by examiner

*Primary Examiner* — Seyed Azarian
(74) *Attorney, Agent, or Firm* — Oliff & Berridge, PLC (57) ABSTRACT

A vehicle position recognition system calculates an estimated position of a vehicle based on satellite positioning and dead reckoning navigation, and calculates a basic error range in which there is a possibility that the vehicle exists. The system calculates an estimated error amount regarding a directional error factor. The directional error factor is an error factor that tends to cause an error in a specific direction with respect to a vehicle traveling direction. The estimated error amount is an estimated amount of the error that is caused by the directional error factor. The system adjusts the basic error range based on (1) a direction in which the error tends to be caused by the directional error factor and (2) the estimated error amount.

6 Claims, 8 Drawing Sheets

CAPTURED IMAGE

FIG. 3B

FEATURE POINT IMAGE

FIG. 3C

| 4 | 3 | 4 | 2 | 1 | 2 | 2 | 4 | 2 | 2 |
|---|---|---|---|---|---|---|---|---|---|
| 4 | 3 | 4 | 2 | 1 | 2 | 2 | 4 | 2 | 2 |
| 4 | 3 | 4 | 2 | 1 | 2 | 4 | 4 | 2 | 2 |
| 4 | 3 | 4 | 2 | 1 | 2 | 4 | 4 | 2 | 2 |
| 3 | 1 | 1 | 1 | 1 | 1 | 1 | 1 | 1 | 1 |
| 1 | 2 | 2 | 2 | 2 | 2 | 2 | 2 | 2 | 2 |
| 1 | 1 | 1 | 1 | 1 | 1 | 1 | 1 | 1 | 1 |

IMPORTANCE DEGREE LAYER

FIG. 3D

FEATURE POINT IMAGE IN WHICH WEIGHT COEFFICIENTS ARE ASSIGNED

FIG. 3E

| -1 | -1 | -1 | -1 |
|----|----|----|----|
| 1  | 1  | 1  | 1  |
| -3 | -3 | -3 | -3 |

ADJUSTMENT COEFFICIENT LAYER

FIG. 3F

IMAGE FEATURE POINT DATA

VEHICLE POSITION RECOGNITION SYSTEM

INCORPORATION BY REFERENCE

The disclosure of Japanese Patent Application No. 2010-084678 filed on Mar. 31, 2010 including the specification, drawings and abstract is incorporated herein by reference in its entirety.

BACKGROUND OF THE INVENTION

1. Field of the Invention

The invention relates to a vehicle position recognition system that includes a vehicle position calculation unit that calculates an estimated position of a vehicle based on satellite positioning and dead reckoning navigation, and an error range calculation unit that calculates an error range based on the estimated position, taking into account an error in the estimated position.

2. Description of the Related Art

The above-described vehicle position recognition system, which includes the vehicle position calculation unit and the error range calculation unit, is used for calculating a vehicle position in a car navigation apparatus. Japanese Patent Application Publication No. 2005-249654 (JP-A-2005-249654) (paragraphs 0006 to 0009 and 0040, FIG. 1, and FIG. 5) describes a navigation apparatus that determines a vehicle position using satellite positioning, and determines the vehicle position using dead reckoning navigation, as an example of related art. In the navigation apparatus described in the publication No. 2005-249654, a longitudinal slope of a road on which a vehicle is traveling is calculated as an actually-measured slope, based on a change in an altitude measured using the satellite positioning, and the road on which the vehicle is currently traveling is determined as a vehicle traveling road, based on map data that indicates a road map. In the navigation apparatus, further, the reliability degree of the position determined using the satellite positioning is calculated based on the longitudinal slope of each road, or based on the degree of deviation of the actually-measured slope from a range of the longitudinal slope. The radius of a circle indicating an error range is changed according to the degree of reliability. More specifically, the radius of the circle indicating the error range is increased with a decrease in the degree of reliability.

Japanese Patent Application Publication No. 11-37776 (JP-A-11-37776) (paragraphs 0008 to 0014, FIG. 3, and FIG. 4) describes a navigation apparatus for a vehicle as another example of related art. In the navigation apparatus described in the publication No. 11-37776, a travel error range is obtained based on a vehicle traveling position calculated using signals from vehicle-mounted sensors, and an error of accuracy in the calculated vehicle traveling position. A differential GPS (DGPS) error range is obtained based on the vehicle position determined using the DGPS and the error of accuracy in the obtained vehicle position. A more limited vehicle existing range is set based on the travel error range and the DGPS error range. The vehicle position on a road is estimated based on the vehicle existing range and road map information. Further, in the navigation apparatus for a vehicle, the vehicle existing range is set to a range where the travel error range and the DGPS error range overlap with each other, or one of the travel error range and the DGPS error range, which is smaller than the other. Thus, the small and accurate vehicle existing range is set.

SUMMARY OF THE INVENTION

Each of the above-described two publications describes the technology in which the size of the error range is changed based on an error factor that causes an error when estimating the vehicle position. However, in the technology described in the publication No. 2005-249654, the radius of the error range is simply increased or decreased. Particularly, because the size of the front region of the error range in a vehicle traveling direction in which the vehicle is traveling is equal to the size of the rear region of the error range in the vehicle traveling direction, this technology does not sufficiently contribute to accurate estimation of the vehicle position. In the technology described in the publication No. 11-37776, the error range is adjusted simply by obtaining a logical product of the two error ranges calculated by different methods. This technology does not sufficiently contribute to accurate estimation of the vehicle position, either. For example, in the case where the vehicle position is estimated more accurately through scene matching or the like, unless the error range that is as accurate as possible and as small as possible is set, a large number of scenic images are used as matching candidates, and thus, matching efficiency decreases. In general, in the matching processing, a plurality of reference images are prepared so that the reference images serve as matching candidates for a subject image that is subjected to the matching processing. The matching processing is repeated while the reference images are sequentially set. Because only one reference image matches the subject image, matching processing between the other reference images and the subject image is useless processing. Therefore, when the number of the reference images prepared for matching, which include the reference image that matches the subject image, is small, the matching efficiency is high. Thus, a more accurate and smaller error range is required. Taking into account this situation, it is desired to develop a technology in which when the estimated position of the vehicle is calculated based on the satellite positioning and the dead reckoning navigation, the error range of the estimated position is calculated more accurately.

A first aspect of the invention relates to a vehicle position recognition system including: a vehicle position calculation unit that calculates an estimated position of a vehicle based on satellite positioning and dead reckoning navigation; an error range calculation unit that calculates a basic error range, wherein there is a possibility that the vehicle exists in the basic error range; a first estimated error amount calculation unit that calculates at least one first estimated error amount regarding at least one directional error factor, wherein the at least one directional error factor is at least one error factor that tends to cause at least one error in at least one specific direction with respect to a vehicle traveling direction, and the at lest one first estimated error amount is at least one estimated amount of the at least one error that is caused by the at least one directional error factor; and a first error range adjustment unit that adjusts the basic error range based on at least one direction in which the at least one error tends to be caused by the at least one directional error factor, and the at least one first estimated error amount.

According to the first aspect, the basic error range is adjusted by estimating the error amount(s) caused by the directional error factor(s) that tend(s) to cause the error(s) in the specific direction(s) with respect to the vehicle traveling direction. Thus, it is possible to appropriately adjust the basic error range, taking into account the direction(s) in which the error(s) tend(s) to be caused with respect to the vehicle traveling direction, and the estimated amount(s) of the error(s) that is(are) caused. Accordingly, the adjusted error range thus obtained is more accurate and smaller. This makes it possible to efficiently provide various kinds of guidance in the error range, when the vehicle position recognition system is used, for example, in a navigation system.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
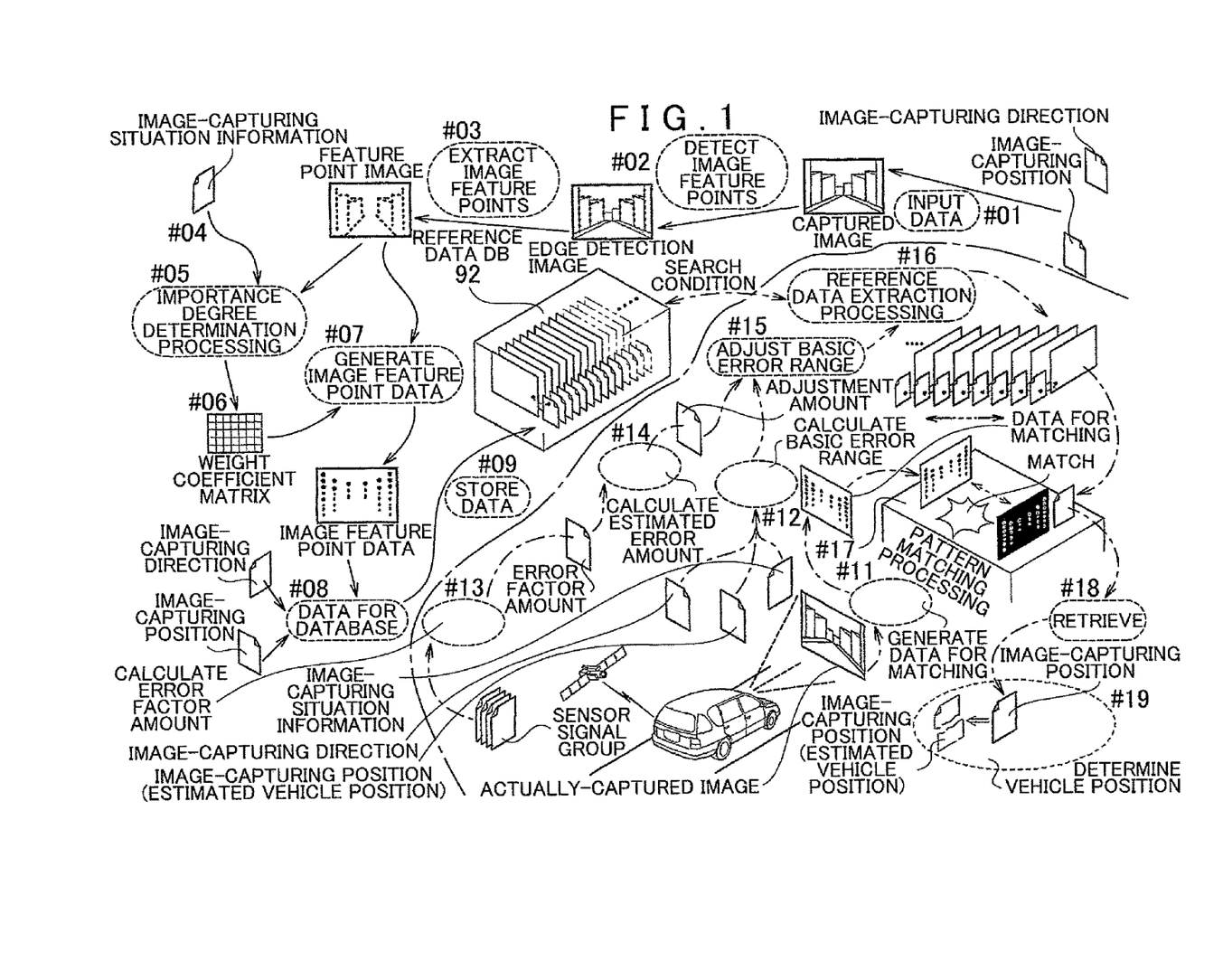
FIG. 1 is a schematic diagram used for explaining the basic concept of vehicle position determination through scene matching using a vehicle position recognition system according to an embodiment of the invention.

Hereinafter, an embodiment of the invention will be described in detail with reference to the drawings. FIG. 1 schematically shows the basic concept of a vehicle position recognition system according to the embodiment of the invention, which recognizes, through matching processing, a scenic image captured by a vehicle-mounted camera disposed to capture an image of a scene ahead of a vehicle in a direction in which the vehicle is traveling (hereinafter, referred to as "vehicle traveling direction"), so that a position at which the scenic image is captured, that is, a vehicle position is determined.

First, a procedure for creating a reference data database (hereinafter, simply referred to as "reference data DB") 92, which stores a reference data as a matching candidate, will be described. As shown in FIG. 1, first, a captured image obtained by capturing an image of a scene viewed from a vehicle during travel, and image-capturing attribute information are input (step 01). The image-capturing attribute information includes an image-capturing position of the captured image and an image-capturing direction of the captured image at the time of image capturing. The term "an image-capturing position of the captured image" signifies a position at which the image is captured to obtain the captured image. The term "an image-capturing direction of the captured image" signifies a direction in which the image is captured to obtain the captured image. Then, feature point detection processing for detecting image feature points, for example, edge detection processing is performed on the input captured image (step 02). A portion, at which edge points corresponding to one or more pixels constitute one line segment, for example, an outline, is referred to as "a line segment edge". An intersection point, at which a plurality of the line segment edges intersect with each other, is referred to as "a corner". The edge points, which constitute the line segment edge, are referred to as "line segment edge points". Among the line segment edge points, the edge point corresponding to the corner is referred to as "a corner edge point". The line segment edge points and the corner edge point are examples of the image feature point. The line segment edge points including the corner edge point are extracted, as the image feature points, from an edge detection image obtained through the edge detection processing (step 03).

Taking into account that the image feature points are used for scenic image recognition, all the extracted image feature points do not necessarily have the same importance degree. For example, the importance degree of each image feature point may depend on the position coordinates of the image feature point in the captured image. Therefore, it is preferable to determine the importance degree of each image feature point by applying a rule of decreasing the importance degree of the image feature point that is not appropriate for the scenic image recognition, and/or increasing the importance degree of the image feature point that is important in the scenic image recognition (step 04). After the importance degree of each image feature point is determined, a weight coefficient matrix is generated (step 05). The weight coefficient matrix stipulates the assignment of weight coefficients to the image feature points in accordance with the importance degrees of the image feature points.

Subsequently, image feature point data for each captured image is generated by performing processing on the image feature points using the weight coefficient matrix (step 07). During the process of creating the image feature point data, selection processing is performed. That is, the image feature points with the weight coefficients equal to or lower than a first threshold value are discarded, and/or the image feature points are discarded except the image feature points with the weight coefficients equal to or higher than a second threshold value and the image feature points around the image feature points with the weight coefficients equal to or higher than the second threshold value. When pattern matching is employed for the scenic image recognition, the image feature point data generated in this step is used as the pattern. Therefore, in order to achieve the high-speed performance and high accuracy of the matching, it is important that the image feature point data includes only the image feature points useful for the pattern matching for the scenic image. The generated image feature point data is associated with an image-capturing position and an image-capturing direction of the captured image corresponding to the image feature point data, and a vehicle behavior. The term "an image-capturing position of the captured image" signifies a position at which the image is captured to obtain the captured image. The term "an image-capturing direction of the captured image" signifies a direction in which the image is captured to obtain the captured image. Thus, the generated image feature point data becomes data for a database that is searchable using the image-capturing position, the image-capturing direction, and the vehicle behavior as search conditions (step 08). That is, the image feature point data is stored in the reference data DB 92 as the reference data used for the scenic image recognition, that is, the data to be extracted as the matching candidate (step 09).

Next, a procedure for determining the position of the vehicle (vehicle position) while the vehicle is actually traveling using the reference data DB 92 created by the above-described procedure will be described. As shown in FIG. 1, an estimated vehicle position that is estimated using a GPS measurement unit and the like, an actually-captured image which is obtained by capturing an image of a scene using the vehicle-mounted camera, and whose image-capturing position is the estimated vehicle position, the image-capturing direction of the actually-captured image, image-capturing situation information, and a group of signals from sensors (hereinafter, may be referred to as "sensor signal group") are input. First, data for matching, which is the image feature point data, is generated through the step 02 to 07, based on the input captured image and the input image-capturing situation information (step 11).

Further, a basic error range whose center is the estimated vehicle position is calculated based on the estimated vehicle position that is the input image-capturing position (step 12). Also, the input sensor signal group is evaluated, and at least one error factor amount is calculated (step 13). The error factor amount is obtained by quantifying a directional error factor. The directional error factor is an error factor that tends to cause an error in a specific direction with respect to the vehicle traveling direction. Then, an estimated error amount, which is an estimated value of an error, is calculated based on the error factor amount(s) calculated for the corresponding error factor(s) (step 14). The estimated error amount has a sign, and thus, the error amount includes a direction in which an error tends to be caused (for example, a vehicle forward direction, or a vehicle rearward direction). The estimated error amount, which is calculated based on the error factor amount(s) for the directional error factor(s), and which includes the direction in which an error tends to be caused, is used as an adjustment amount for the above-described basic error range (step 15). The basic error range adjusted using the estimated error amount (i.e., the adjusted error range) is used as a range for extracting a set of the reference data as matching candidates from the reference data DB 92, that is, a search condition regarding the image-capturing position. A set of the reference data is extracted from the reference data DB 92 using the search condition, and the extracted set of the reference data serves as the matching candidates for the data for matching generated from the actually-captured image (step 16).

Each reference data included in the extracted matching candidate reference dataset is set as the pattern, and the processing of pattern matching between each pattern and the generated data for matching is performed as the scenic image recognition (step 17). When the reference data, which is set as the pattern, matches the generated data for matching, the image-capturing position associated with the reference data that matches the generated data for matching is retrieved (step 18). The retrieved image-capturing position is determined to be a formal vehicle position, instead of the estimated vehicle position (step 19).

Figure 2:
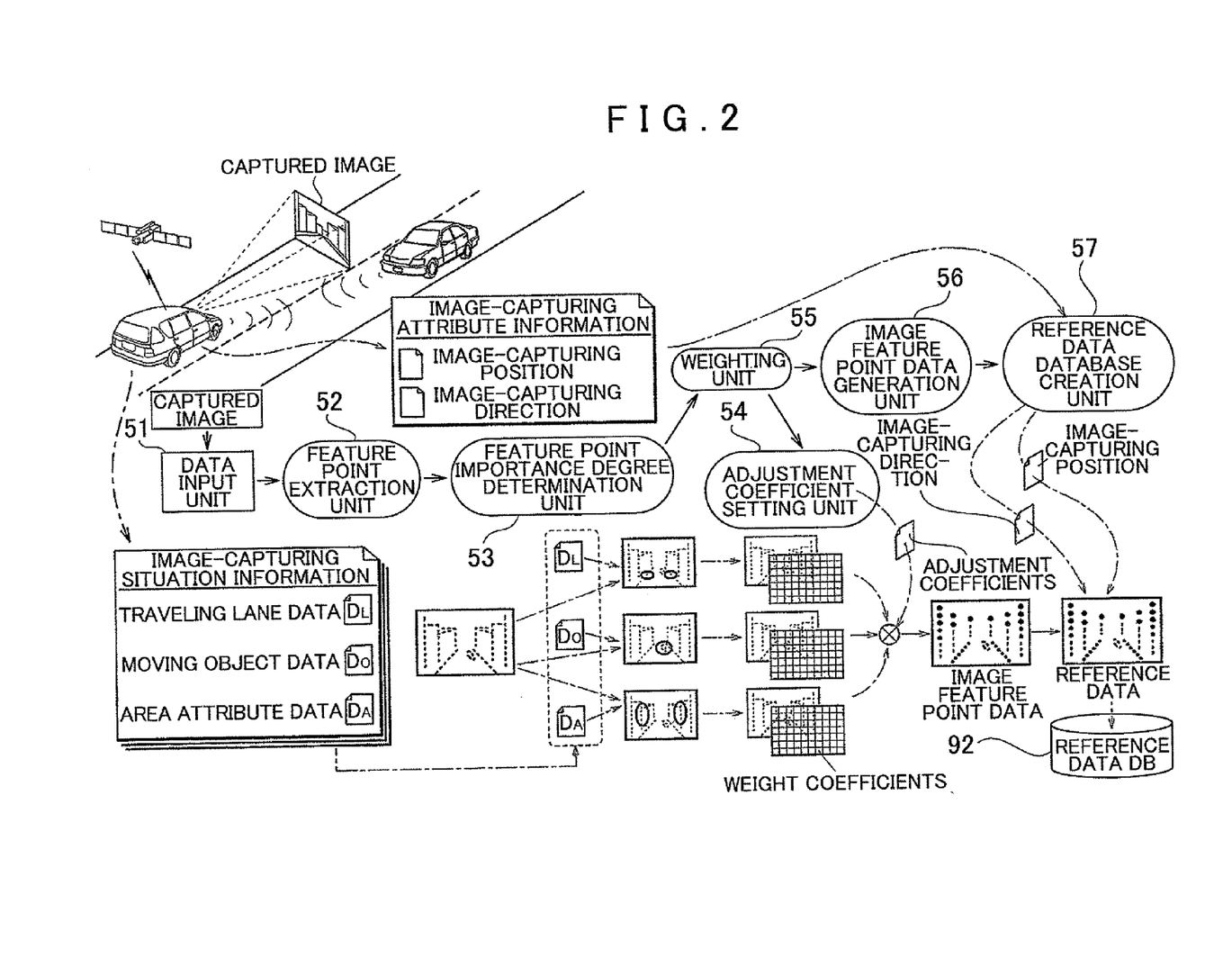
FIG. 2 is a functional block diagram schematically showing main functions and operations of an image processing system that generates reference data used for scene matching.

Next, the image processing system according to the embodiment of the invention, which generates the reference data from the captured image used in the above-described vehicle position recognition system, will be described. A functional block diagram in FIG. 2 schematically shows functions of the image processing system, which are particularly related to the embodiment of the invention.

The image processing system includes functional units, such as a data input unit 51, a feature point extraction unit 52, a feature point importance degree determination unit 53, a weighting unit 55, an adjustment coefficient setting unit 54, an image feature point data generation unit 56, and a reference data database creation unit 57. Each of the functions may be implemented by hardware, software, or combination of hardware and software.

The captured image obtained by capturing an image of a scene using the camera provided in a vehicle, the image-capturing attribute information including the image-capturing position and the image-capturing direction at the time of image capturing, and the image-capturing situation information are input to the data input unit 51. The vehicle may be a vehicle that is traveling for the purpose of creating the reference data. In an example in which the image processing system is provided in the vehicle, the captured image, the image-capturing attribute information, and the image-capturing situation information are input to the data input unit 51 in real time. However, in an example in which the image processing system is installed in a data processing center or the like, the captured image, the image-capturing attribute information, and the image-capturing situation information are temporarily stored in a storage medium, and these data are input to the data input unit 51 in a batch processing manner. Methods of generating the captured image and the image-capturing attribute information are known, and therefore, the description thereof is omitted.

The image-capturing situation information is information indicating the possibility that a specific subject is included in the captured image. Examples of the specific subject include objects that define a traveling lane in which the vehicle travels, such as a guide rail and a groove at a road shoulder, moving objects such as a nearby traveling vehicle, an oncoming vehicle, a bicycle, and a pedestrian, and scenic objects that are the features of a mountainous area, a suburban area, an urban area, a high-rise building area, and the like, such as a mountain and a building. In the embodiment, the contents of the image-capturing situation information include traveling lane data $D_L$, moving object data $D_O$, and area attribute data $D_A$. The traveling lane data $D_L$ is data that shows a region of the traveling lane, and a region outside a road, in the captured image. The traveling lane data $D_L$ is obtained based on the result of recognition of white lines, a guide rail, and a safety zone. The white lines, the guide rail, and the safety zone are recognized through the image processing performed on the captured image. The moving object data $D_O$ is data that shows a region where a moving object near the vehicle exists in the captured image. The moving object near the vehicle is recognized by a vehicle-mounted sensor that detects an obstacle, such as a radar. The area attribute data $D_A$ is data that shows the type of an image-capturing area in which the captured image is obtained by capturing the image, that is, an area attribute of the image-capturing area. Examples of the area attribute include a mountainous area, a suburban area, an urban area, and a high-rise building area. The type, that is, the area attribute of the image-capturing area is recognized based on the vehicle position when the captured image is obtained by capturing the image, and map data.

The feature point extraction unit 52 extracts the edge points from the captured image, as the image feature points, using an appropriate operator. The feature point importance degree determination unit 53 determines the importance degrees of the image feature points extracted by the feature point extraction unit 52, based on the contents of each data included in the image-capturing situation information. For example, when the contents of the traveling lane data $D_L$ are used, a high importance degree is assigned to the image feature point in a road shoulder-side region outside the traveling lane in the captured image, as compared to an importance degree assigned to the image feature point in a region inside the traveling lane in the captured image. When the moving object data $D_O$ is used, a low importance degree is assigned to the image feature point in a region where a moving object exists in the captured image, as compared to an importance degree assigned to the image feature point in a region where the moving object does not exist in the captured image. Further, when the contents of the area attribute data $D_A$ are used, a rule for assigning the importance degrees to the image feature points in accordance with the positions of the image feature points in the captured image is changed in accordance with the above-described area attribute. For example, in the captured image of a mountainous area, because there is a high possibility that there is sky above a central optical axis for image capturing, and there are woods on the right and left sides of the central optical axis for image capturing, a high importance degree is assigned to the image feature point in a center region around the central optical axis for image capturing, as compared to an importance degree assigned to the image feature point in a region other than the central region. In the captured image of a suburban area, because there is not much traffic, and there are structural objects such as houses around, a high importance degree is assigned to the image feature point in a region below the central optical axis for image capturing, as compared to an importance degree assigned to the image feature point in a region above the central optical axis for image capturing. In the captured image of an urban area, because there is much traffic, a high importance degree is assigned to the image feature point in a region above the central optical axis for image capturing, as compared to a region below the central optical axis for image capturing. In the captured image of a high-rise building area, because there are many elevated roads and elevated bridges, a high importance degree is assigned to the image feature point in a region above the central optical axis for image capturing, as compared to a region below the central optical axis for image capturing.

The weighting unit 55 assigns weight coefficients to the image feature points in accordance with the importance degrees assigned by the feature point importance degree determination unit 53. Because a high importance degree is assigned to the image feature point that is considered to be important for performing accurate image recognition (accurate pattern matching), a high weight coefficient is assigned to the image feature point to which a high importance degree has been assigned. On the other hand, taking into account that there is a high possibility that the image feature point, to which a low importance degree has been assigned, is not used for the actual image recognition, or is deleted from the reference data, a low weight coefficient is assigned to the image feature point to which a low importance degree has been assigned so that the low weight coefficient is used for determining whether to select or delete the image feature point.

The adjustment coefficient setting unit 54 calculates adjustment coefficients used for changing the weight coefficients assigned by the weighting unit 55, in view of the distribution state of the weight coefficients in the captured image. The importance degrees, which have been assigned to the image feature points extracted by the feature point extraction unit 52 based on the image-capturing situation information, include certain errors. As a result, there is considered to be a possibility that the image feature points, to which high importance degrees have been assigned, are randomly distributed. Therefore, when the image feature points to which high importance degrees have been assigned are unevenly distributed, in other words, when the image feature points to which high weight coefficients have been assigned by the weighting unit 55 are unevenly distributed, the adjustment coefficient setting unit 54 is used to make the distribution less uneven. When the dispersion of the image feature points obtained through the computation processing indicates that the image feature points to which the high weight coefficients have been assigned are unevenly distributed, the adjustment coefficient is set to increase the weight coefficient(s) of the image feature points in a region where the density of the image feature points to which the high weight coefficients have been assigned is low, and the adjustment coefficient is set to decrease the weight coefficient(s) of the image feature points in a region where the density of the image feature points to which the high weight coefficients have been assigned is high.

The image feature point data generation unit 56 generates the image feature point data for each captured imaged, by performing processing on the image feature points based on the weight coefficients assigned by the weighting unit 55, or based on the weight coefficients and the assigned adjustment coefficients in some cases. When generating the image feature point data, the number of the image feature points may be reduced to efficiently perform the matching processing, by deleting the image feature points with the weighting coefficients equal to or lower than a threshold value. Also, the image feature point data may be provided with the weight coefficients so that the weight coefficients are associated with the image feature points in the reference data as well, and the weight coefficients are used for calculating weighted similarity when the pattern matching processing is performed.

Figure 3A:
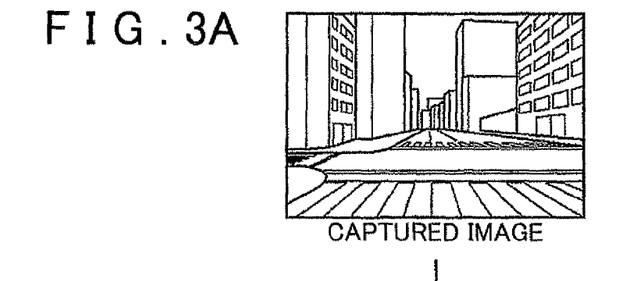
FIGS. 3A to 3F are schematic diagrams schematically showing adjustment of weight coefficients using adjustment coefficients when the reference data is created.
Figures 3B, 3C, 3D, 3E, 3F:
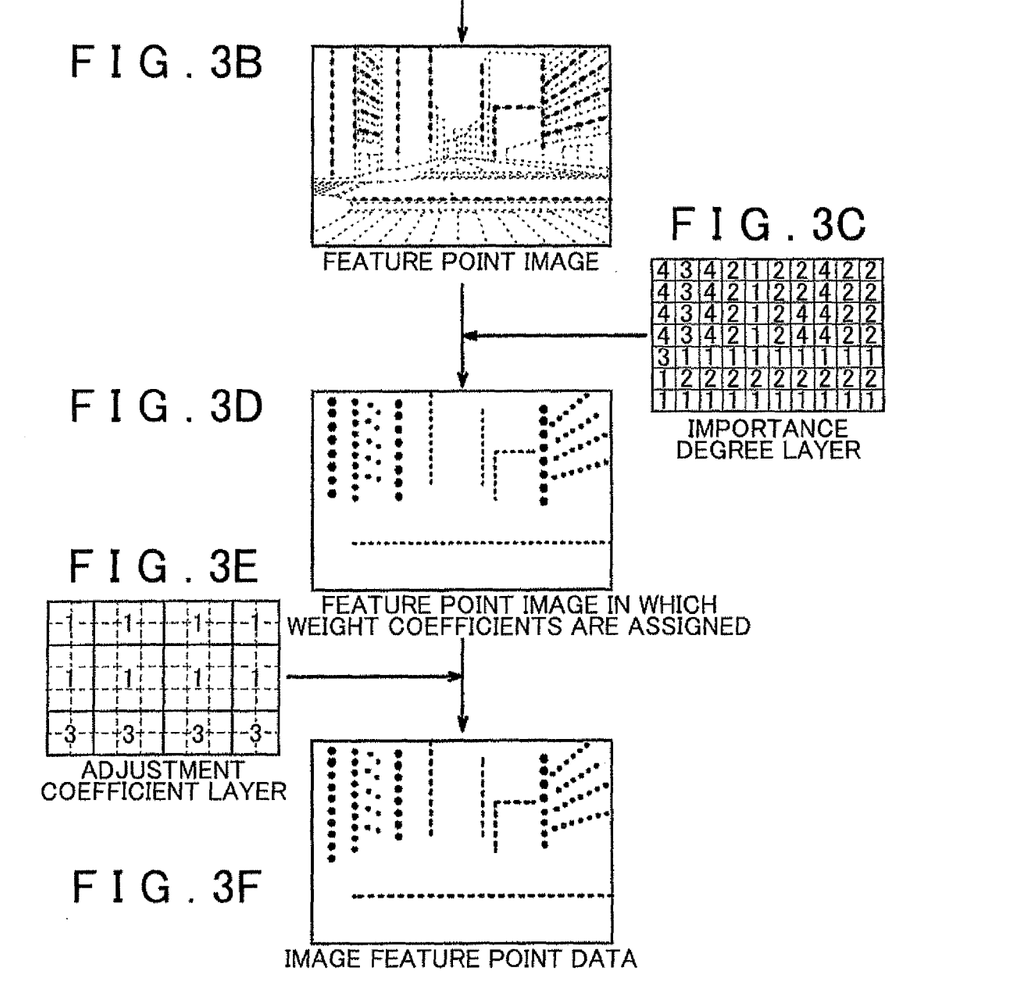

The processing of distributing the image feature points in the image feature point data over an entire region of the captured image as widely as possible using the above-described adjustment coefficients will be described with reference to a schematic explanatory diagram shown in FIGS. 3A to 3F. A feature point image (FIG. 3B) is generated by extracting the image feature points from the captured image (FIG. 3A). The importance degree is assigned to each image feature point in the feature point image. FIG. 3C shows the importance degrees corresponding to the image feature points in the form of an importance degree layer corresponding to the feature point image, in order to make it possible to schematically understand how the importance degrees are assigned. The weighting coefficient is assigned to each image feature point using the importance degree layer. FIG. 3D shows the image feature points to which the weight coefficients have been assigned, in the form of the feature point image in which the size of the image feature point increases as the weight coefficient of the image feature point increases. If processing is performed on the image feature points, for example, to delete the image feature points to which the weight coefficients equal to or lower than the threshold value have been assigned, that is, for example, if the image feature points other than the large-sized image feature points in FIG. 3D are deleted, the image feature points located in a lower region in the feature point image are removed. As a result, the remaining image feature points (that is, the image feature points in the image feature point data) may be extremely unevenly distributed. In order to avoid the uneven distribution of the image feature points, the degree of distribution of the image feature points in the feature point image is calculated, and the adjustment coefficients are set to increase the weight coefficient(s) of the image feature points in a region where the density of the remaining image feature points is low as a result of performing processing on the image feature points. In order to make it possible to schematically understand the adjustment coefficients that are set in the above-described manner, FIG. 3E shows groups of the adjustment coefficients in the form of an adjustment coefficient layer corresponding to the feature point image. In the adjustment coefficient layer, the adjustment coefficients are arranged in a matrix manner (i.e., the adjustment coefficient is assigned to each section composed of a plurality of pixel regions). The image feature point data generation unit 56 performs processing on the image feature points using the weight coefficients and the weight coefficients that are finally set based on the adjustment coefficients, thereby generating the image feature point data shown in FIG. 3F for each captured image.

The reference data database creation unit 57 creates the reference data that is used for the scenic image recognition by associating the image feature point data generated by the image feature point data generation unit 56 with the image-capturing attribute information regarding the captured image corresponding to the image feature point data, and creates the database of the reference data. Thus, the reference data database creation unit 57 creates the database of the reference data. At this time, in order to assist the scenic image recognition, information indicating the vehicle behavior at the time of image capturing is also associated with the reference data. The information indicating the vehicle behavior at the time of image capturing is taken out from vehicle behavior data as a recorded vehicle behavior. Thus, the reference data is stored in the reference data DB 92.

The example, in which the importance degree of each image feature point is determined, and as a result, the weight coefficient of each image feature point is set, has been described above. However, the processing may be performed for each image feature point group. In this case, for example, the region of the captured image may be divided into a plurality of image sections, and the feature point importance degree determination unit 53 may divide the image feature points into image feature point groups so that each image feature point group includes the image feature points in the same image section, and may perform the processing for each image feature point group. In this case, the feature point importance degree determination unit 53 may assign the same importance degree to the image feature points included in the same image feature point group. Similarly, the weighting unit 55 may set the weight coefficient for each image feature point group. In this case, the image sections may be set in a manner such that each image section is composed of one pixel included in the captured image, or each image section is composed of a plurality of pixels. Thus, in the embodiment of the invention, each image section may be composed of one or more pixels.

Figure 4:
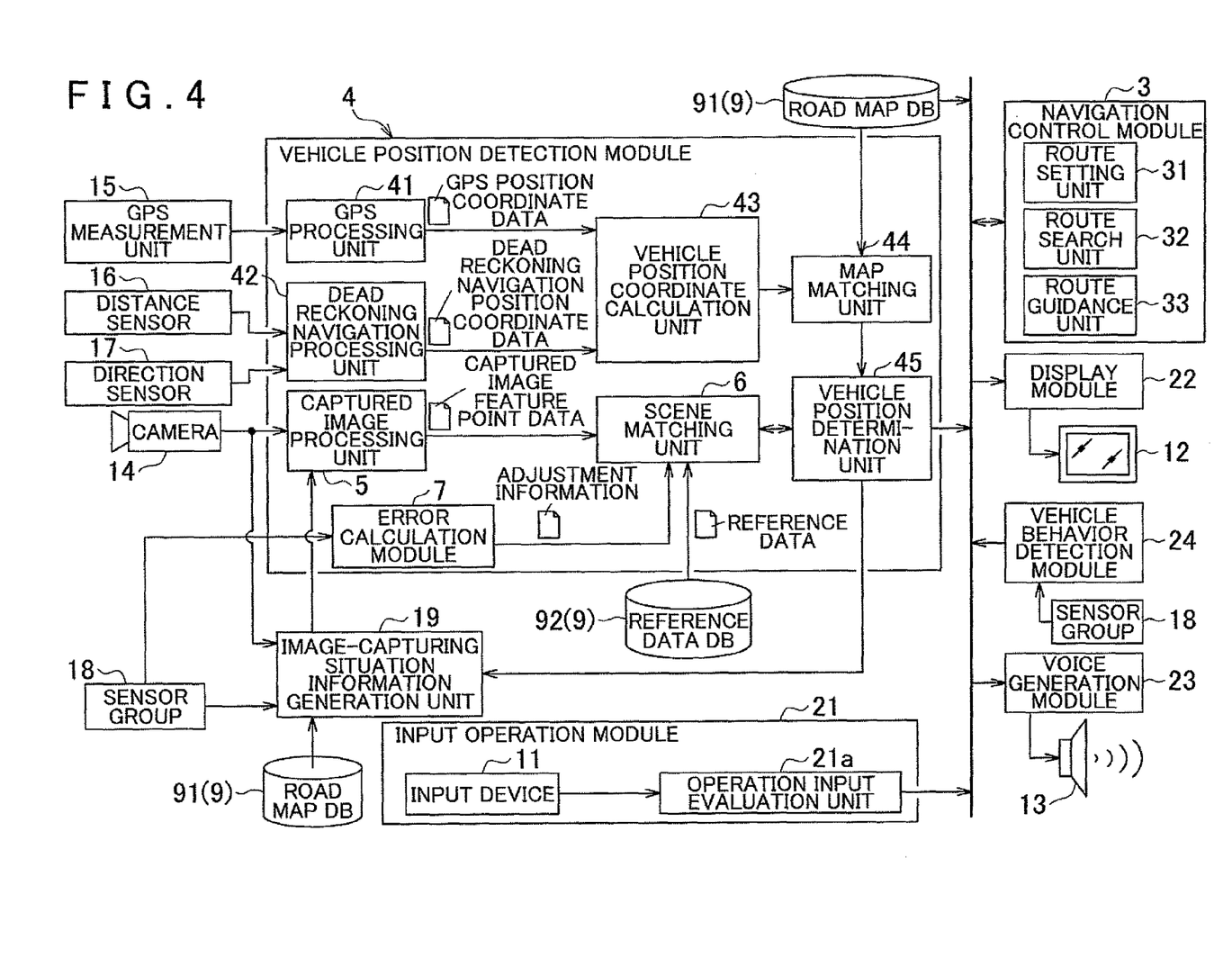
FIG. 4 is a functional block diagram showing functions of a car navigation system that employs an example of the vehicle position recognition system according to the embodiment of the invention.

Next, a vehicle-mounted car navigation system that employs the basic technology of the above-described vehicle position recognition system will be described. FIG. 4 shows functional blocks in an example in which the car navigation system is installed in a vehicle-mounted LAN. The car navigation system includes an input operation module 21, a navigation control module 3, a vehicle position detection module 4, an image-capturing situation information generation unit 19, a database 9 including the above-described reference data DB 92 and a road map database (hereinafter, simply referred to as "road map DB") 91 in which road map data for car navigation is stored, and a vehicle behavior detection module 24. The vehicle behavior detection module 24 receives sensor signals and control signals that indicate various vehicle behaviors, such as a braking behavior, an accelerating behavior, and a steering behavior in the vehicle through the vehicle-mounted LAN. Then, the vehicle behavior detection module 24 generates and outputs the vehicle behavior data including the various vehicle behaviors.

The navigation control module 3 includes a route setting unit 31, a route search unit 32, and a route guidance unit 33. For example, the route setting unit 31 sets a departure point such as the current vehicle position, a destination that has been input, and pass-through points, and a traveling condition (for example, a condition as to whether an expressway is to be used). The route search unit 32 is a processing unit that performs computation processing for searching for a guidance route from the departure point to the destination based on the condition set by the route setting unit 31. The route guidance unit 33 is a processing unit that performs computation processing for providing appropriate route guidance to a driver in accordance with the route from the departure point to the destination, which is retrieved by the route search unit 32 as a result of searching. The route guidance unit 33 provides the route guidance, using guidance displayed on the screen of a monitor 12, voice guidance output from a speaker 13, and the like.

The vehicle position detection module 4 has a function of correcting the estimated vehicle position obtained by performing conventional position calculation using the GPS and performing conventional position calculation using dead reckoning navigation. The vehicle position detection module 4 corrects the estimated vehicle position based on the vehicle position determined by the scenic image recognition using the estimated vehicle position. The vehicle position detection module 4 includes a GPS processing unit 41, a dead reckoning navigation processing unit 42, a vehicle position coordinate calculation unit 43, a map matching unit 44, a vehicle position determination unit 45, a captured image processing unit 5, and a scene matching unit 6. The GPS processing unit 41 is connected to a UPS measurement unit 15 that receives UPS signals from GPS satellites. The GPS processing unit 41 analyzes the signals from the GPS satellites received by the GPS measurement unit 15, calculates the current position of the vehicle (i.e., the latitude and the longitude), and transmits the current position of the vehicle to the vehicle position coordinate calculation unit 43 as GPS position coordinate data. The dead reckoning navigation processing unit 42 is connected to a distance sensor 16 and a direction sensor 17. The distance sensor 16 is a sensor that detects the speed and the moving distance of the vehicle. For example, the distance sensor 16 includes a vehicle speed pulse sensor that outputs a pulse signal each time the drive shaft, the wheel, or the like of the vehicle rotates by a certain amount, a yaw rate/acceleration sensor that detects the acceleration of the vehicle, and a circuit that integrates the detected values of the acceleration. The distance sensor 16 outputs information on the speed of the vehicle and information on the moving distance of the vehicle, which are the results of detection, to the dead reckoning navigation processing unit 42. For example, the direction sensor 17 includes a gyro sensor, a geomagnetic sensor, an optical rotation sensor and a rotary variable resistor that are attached to the rotational unit of a steering wheel, and an angle sensor attached to a wheel unit. The direction sensor 17 outputs information on the direction, which is the result of detection, to the dead reckoning navigation processing unit 42. The dead reckoning navigation processing unit 42 computes dead reckoning navigation position coordinates based on the moving distance information and the direction information, which are transmitted to the dead reckoning navigation processing unit 42 at every moment, and transmits the computed dead reckoning navigation position coordinates to the vehicle position coordinate calculation unit 43 as the dead reckoning navigation position coordinate data. The vehicle position coordinate calculation unit 43 performs computation processing to determine the coordinates of the vehicle position based on the GPS position coordinate data and the dead reckoning navigation position coordinate data, using a known method. The calculated vehicle position information includes a measurement error and the like. Therefore, the calculated vehicle position may deviate from a road in some cases. Thus, the map matching unit 44 adjusts the vehicle position information so that the vehicle is positioned on a road shown in the road map. The coordinates of the vehicle position are transmitted to the vehicle position determination unit 45 as the estimated vehicle position.

The captured image processing unit 5 substantially includes most of functional units that constitute the image processing system shown in FIG. 2. The captured image processing unit 5 includes the data input unit 51, the feature point extraction unit 52, the feature point importance degree determination unit 53, the weighting unit 55, the adjustment coefficient setting unit 54, and the image feature point data generation unit 56. When the captured image of a scene ahead of the vehicle, which is the image captured by the vehicle-mounted camera 14, is input to the data input unit 51, the image feature point data is output from the image feature point data generation unit 56 through the above-described steps. The image-capturing situation information used by the feature point importance degree determination unit 53 is generated by the image-capturing situation information generation unit 19 provided in the vehicle, and transmitted to the captured image processing unit 5. The image-capturing situation information generation unit 19 is connected to the vehicle-mounted camera 14 in order to generate the above-described traveling lane data $D_L$, and the image-capturing situation information generation unit 19 receives the captured image that is the same as the captured image transmitted to the captured image processing unit 5. The traveling lane data $D_L$ is created by performing image processing on the received captured image, using a known algorithm. The image-capturing situation information generation unit 19 is connected to a sensor group 18 for detecting an obstacle, in order to create the above-described moving object data $D_O$. The image-capturing situation information generation unit 19 creates the moving object data $D_O$ based on sensor information transmitted from the sensor group 18. Further, the image-capturing situation information generation unit 19 is connected to the vehicle position determination unit 45 and the database 9, in order to create the above-described area attribute data $D_A$. The image-capturing situation information generation unit 19 obtains the area attribute of an area where the vehicle is currently traveling, by searching the database 9 using the coordinates of the vehicle position transmitted from the vehicle position determination unit 45 as a search condition. Examples of the area attribute include a mountainous area and an urban area. The image-capturing situation information generation unit 19 creates the area attribute data $D_A$ based on the obtained area attribute.

The scene matching unit 6 extracts a reference dataset that includes a predetermined number of the reference data, from the reference data DB 92 in a manner described in detail later. The scene matching unit 6 performs pattern matching processing on the image feature point data transmitted from the captured image processing unit 5, while sequentially setting each reference data of the reference dataset as the matching candidate. When the reference data matches the image feature point data, the image-capturing position associated with the reference data that matches the image feature point data is retrieved. The retrieved image-capturing position is transmitted to the vehicle position determination unit 45, as the vehicle position. The vehicle position determination unit 45 corrects the vehicle position, that is, replaces the estimated vehicle position with the transmitted vehicle position. As described in detail later, in the scene matching unit 6, the basic error range is calculated based on the estimated vehicle position input from the vehicle position determination unit 45. Further, the basic error range is adjusted based on adjustment information input from an error calculation module 7. The basic error range that has been adjusted, that is, the adjusted error range is used as an extraction range when the reference data is extracted from the reference data DB 92.

The car navigation system further includes, as peripheral devices, an input operation module 21, a display module 22, and a voice generation module 23. The input operation module 21 includes an input device 11 including a touch panel and a switch; and an operation input evaluation unit 21*a* that transforms an operation input through the input device 11 to an appropriate operation signal, and transmits the operation signal to the car navigation system. The display module 22 causes the monitor 12 to display image information necessary for car navigation. The voice generation module 23 causes the speaker 13 and a buzzer to output voice information necessary for car navigation.

Figure 5:
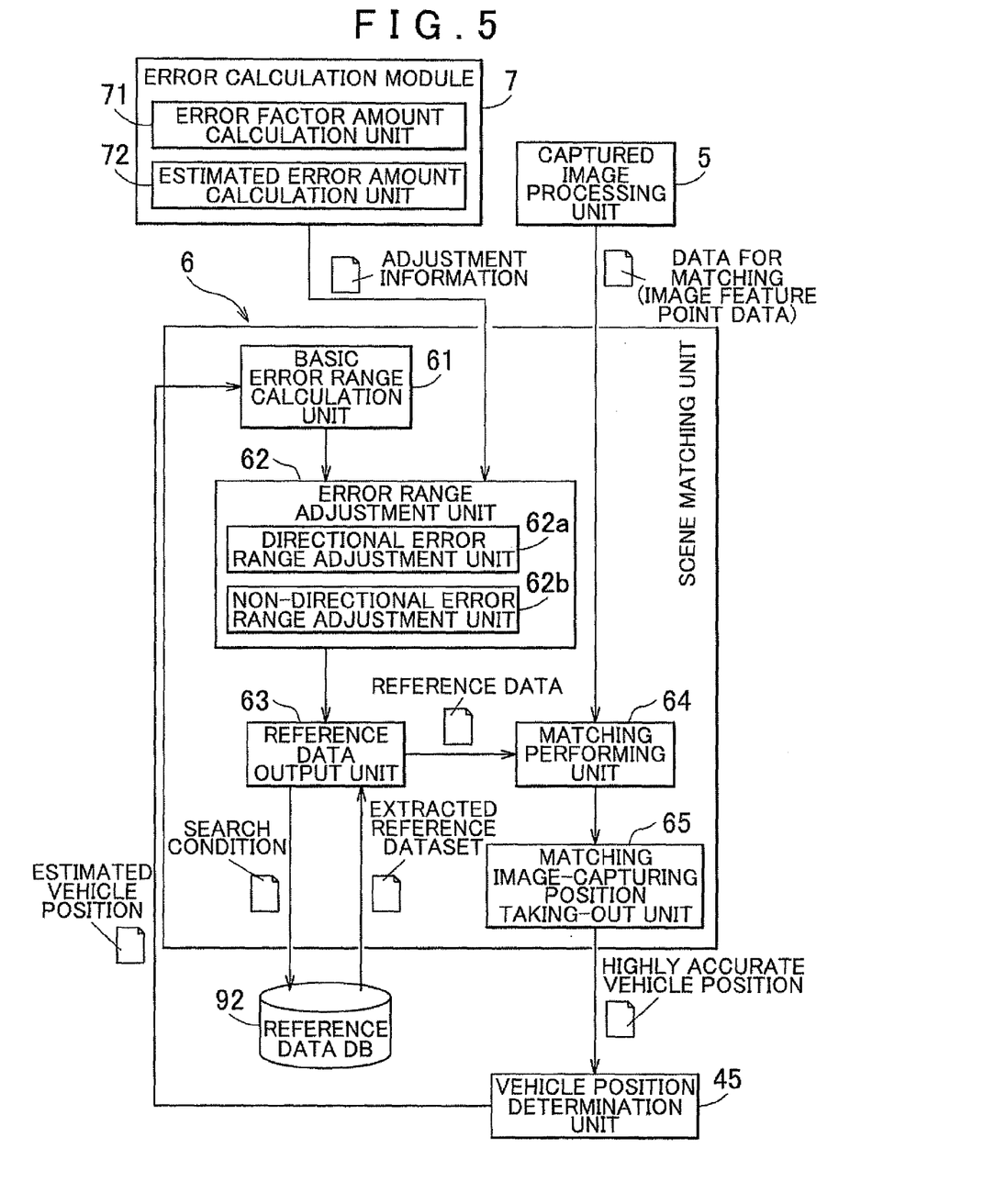
FIG. 5 is a functional block diagram showing an example of the vehicle position recognition system according to the embodiment of the invention, and functions of a scene matching unit.

Next, the functional configuration of the scene matching unit 6 will be described with reference to FIG. 5. The scene matching unit 6 includes a basic error range calculation unit 61, an error range adjustment unit 62, a reference data output unit 63, a matching performing unit 64, and a matching image-capturing position taking-out unit 65. The basic error range calculation unit 62 receives the estimated vehicle position from the vehicle position determination unit 45, and calculates the basic error range whose center is the estimated vehicle position, using a conventionally known algorithm. There is a possibility that the vehicle exists in the basic error range. The basic error range is a circle or an ellipse whose long axis extends in a direction along a road. The error range adjustment unit 62 adjusts the basic error range based on the adjustment information transmitted from the error calculation module 7 described in detail later, and thus, generates the adjusted error range. The directional error factor is an error factor that tends to cause an error in a specific direction, for example, the vehicle forward direction or the vehicle rearward direction, a vehicle rightward direction or a vehicle leftward direction, or a vehicle oblique direction. The term "the vehicle forward direction" signifies a direction from the vehicle toward a position ahead of the vehicle when the vehicle is traveling. The term "the vehicle rearward direction" signifies a direction from the vehicle toward a position behind the vehicle when the vehicle is traveling. The term "the vehicle rightward direction" and "the vehicle leftward direction" signify directions that extend at an angle of 90° with respect to the vehicle traveling direction. The term "vehicle oblique direction" signifies a direction that extends at an angle of, for example, 30° or 60° with respect to the vehicle traveling direction. A non-directional error factor is an error factor that does not tend to cause an error in a specific direction, and causes errors evenly in all directions. In the embodiment, the adjustment information includes a directional estimated error amount and a non-directional estimated error amount. The directional estimated error amount is an estimated error amount that has a directional property. The non-directional estimated error amount is an estimated error amount that does not have such a directional property. The directional estimated error amount is an amount that indicates the direction in which an error tends to be caused, such as the vehicle forward direction or the vehicle rearward direction, and the error amount. Accordingly, the error range adjustment unit 62 includes a directional error range adjustment unit 62a that adjusts the basic error range based on the directional estimated error amount, and a non-directional error range adjustment unit 62b that adjusts the basic error range based on the non-directional estimated error amount. The directional error range adjustment unit 62a has a function of adjusting the basic error range by offsetting the center of the basic error range from the estimated vehicle position in the vehicle traveling direction based on the directional estimated error amount, and a function of adjusting at least one of a front region and a rear region, in the vehicle traveling direction, of the basic error range based on the estimated vehicle position. The non-directional error range adjustment unit 62b has a front-rear adjustment function that is a function of evenly adjusting the front region and the rear region of the basic error range in the vehicle traveling direction. Instead of the front-rear adjustment function, the non-directional error range adjustment unit 62b may have a right-left adjustment function that is a function of evenly adjusting a right region and a left region of the basic error range in a direction orthogonal to the vehicle traveling direction on a horizontal plane. Alternatively, the non-directional error range adjustment unit 62b may have both of the front-rear adjustment function and the right-left adjustment function.

The reference data output unit 63 creates a search condition for extracting the appropriate matching candidates for the data for matching generated by the captured image processing unit 5, based on the adjusted error range transmitted from the error range adjustment unit 62. Further, the reference data output unit 63 transmits a set of the reference data extracted from the reference data DB 92 using the search condition, to the matching performing unit 64. The reference data is regarded as surrounding information regarding a surrounding region around the estimated vehicle position, and the basic error range is regarded as a surrounding information obtaining range for obtaining the surrounding information. Thus, the reference data output unit 63 functions as a surrounding information obtaining range determination unit that determines the surrounding information obtaining range for obtaining the surrounding information. The reference data output unit 63, which functions as the surrounding information obtaining range determination unit, determines the surrounding information obtaining range based on the adjusted error range, when the basic error range is adjusted by the error range adjustment unit 62. In the embodiment, the surrounding information is the reference data for the scene matching used when the scenic image recognition is performed based on the captured image obtained by capturing an image of a scene viewed from a vehicle. In addition, the reference data output unit 63, which functions as the surrounding information obtaining range determination unit, uses the surrounding information obtaining range as the extraction range for extracting the reference data from the database, when the vehicle position is accurately determined through matching between the reference data and the data for matching generated from the actually-captured image obtained by capturing an image of a scene using the vehicle-mounted camera. The matching performing unit 64 performs the pattern matching on the data for matching, while sequentially setting each reference data in the extracted reference dataset, as the pattern. When the reference data matches the data for matching, the matching image-capturing position taking-out unit 65 retrieves the image-capturing position (the vehicle position) associated with the reference data that matches the data for matching, and transmits the retrieved image-capturing position to the vehicle position determination unit 45 as the highly accurate vehicle position.

Figure 6:
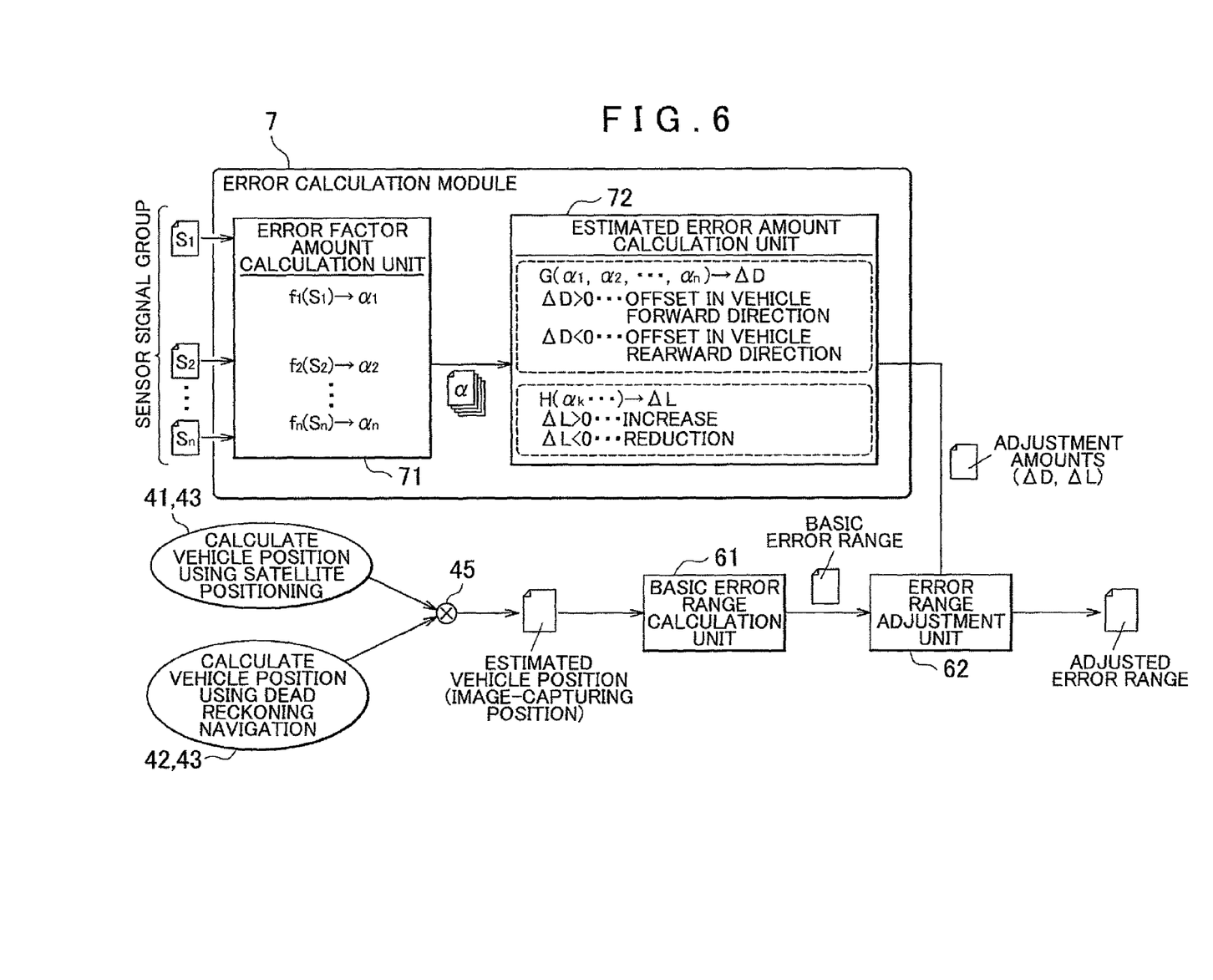
FIG. 6 is a functional block diagram showing the configuration of an error calculation module that is a main constituent element of the vehicle position recognition system according to the embodiment of the invention.

Next, the function performed by the error calculation module 7 will be schematically described with reference to FIG. 6. The error calculation module 7 has a calculation function, that is, when the error calculation module 7 receives sensor signals from sensors that detect drive amounts of the vehicle, and sensor signals from sensors that detect vehicle control amounts, the error calculation module 7 outputs the adjustment amount for the basic error range, which includes the directional estimated error amount and the non-directional estimated error amount. In this case, the calculation is performed in two steps. The error calculation module 7 includes an error factor amount calculation unit 71 that calculates error factor amounts based on the sensor signals, and an estimated error amount calculation unit 72 that calculates the directional estimated error amount and the non-directional estimated error amount based on the error factor amounts $\alpha$ ($\alpha_1$ to $\alpha_n$) calculated by the error factor amount calculation unit 71. In the error factor amount calculation unit 71, functions $f_1$ to $f_n$, for deriving the error factor amounts $\alpha_1$ to $\alpha_n$ based on sensor signals $S_1$ to $S_n$ are stored in the form of a table or conditional equations. The sensor signals $S_1$ to $S_n$ indicate a road inclination, a steering amount, a steering change rate, a slip amount, and the like. The error factor amounts are the amounts of influence of the road inclination, the steering amount, the steering change rate, the slip amount, and the like on the estimated error in the estimated vehicle position. In the estimated error amount calculation unit 72, functions G for deriving the directional estimated error amount $\Delta D$ based on the error factor amounts $\alpha_1$ to $\alpha_n$ are stored in the form of a table, a conditional equation, a rule base, or a neural network. The directional estimated error amount $\Delta D$ is an amount with a sign. For example, when the directional estimated error amount $\Delta D$ is a positive amount, the directional estimated error amount $\Delta D$ is used as the adjustment amount for offsetting the above-described basic error range in the vehicle forward direction. When the directional estimated error amount $\Delta D$ is a negative amount, the directional estimated error amount $\Delta D$ is used as the adjustment amount for offsetting the above-described basic error range in the vehicle rearward direction. Typical examples of the directional estimated error amount include amounts relating to a conversion error due to conversion from three-dimensional data regarding a slope road to two-dimensional data, a travel distance error due to travel in a zigzag manner within a road width, a travel distance error due to tire slip, and a travel distance error due to pulse missing in a pulse detection type distance sensor. In the above-described example, in general, when pulse missing occurs in the pulse detection type distance sensor, the directional estimated error amount $\Delta D$ is a negative amount, and therefore, the basic error range is offset in the vehicle rearward direction. In other cases, the directional estimated error amount $\Delta D$ is a positive amount, and therefore, the basic error range is offset in the vehicle forward direction. Further, in the estimated error amount calculation unit 72, functions H for deriving a non-directional estimated error amount $\Delta L$ based on the error factor amount(s) selected from among the error factor amounts $\alpha_1$ to $\alpha_n$, are stored in the form of a table, conditional equations, a rule base, or a neutral network. The non-directional estimated error amount $\Delta L$ also has a positive sign or a negative sign. However, the sign does not indicate a directional property. When the non-directional estimated error amount $\Delta L$ is a positive amount, the non-directional estimated error amount $\Delta L$ indicates that the basic error range is increased, and when the non-directional estimated error amount ΔL is a negative amount, the non-directional estimated error amount ΔL indicates that the basic error range is reduced.

The adjustment amounts ΔD and ΔL, which are the adjustment information output from the error calculation module 7, are transmitted to the error range adjustment unit 62. When the vehicle position calculated using satellite positioning, and the vehicle position calculated using dead reckoning navigation are transmitted to the vehicle position determination unit 45, the estimated vehicle position is output to the basic error range calculation unit 61. Further, in the basic error range calculation unit 61, the basic error range is calculated based on the estimated vehicle position, and the calculated basic error range is output to the error range adjustment unit 62. In the error range adjustment unit 62, the basic error range is adjusted by amounts corresponding to the adjustment amounts ΔD and ΔL, and then, the adjusted error range is transmitted to the reference data output unit 63.

Figure 7A:
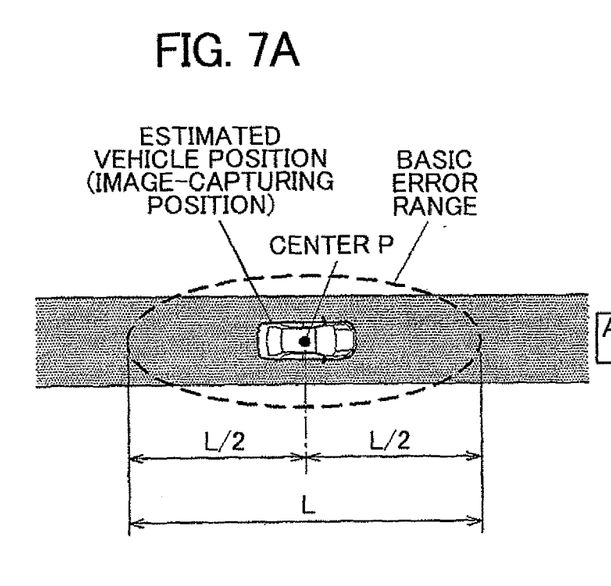
FIGS. 7A to 7C are explanatory diagrams schematically showing adjustment of a basic error range based on adjustment information output from the error calculation module.
Figure 7B:
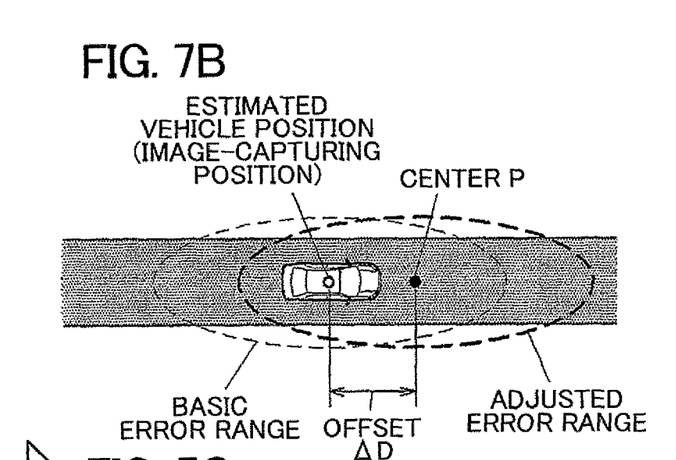
Figure 7C:
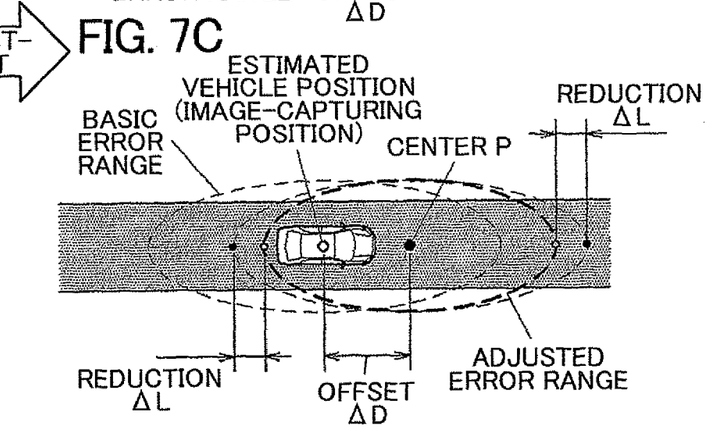

Next, a manner in which the basic error range is adjusted using the adjustment amounts ΔD and ΔL will be described with reference to FIGS. 7A to 7C. In an example shown in FIG. 7A, a center P of the basic error range coincides with the estimated vehicle position (the image-capturing position). In a length L of the basic error range, a length of the front region of the basic error range in the vehicle traveling direction is equal to a length of the rear region of the basic error range in the vehicle traveling direction. Thus, the front region of the basic error range in the vehicle traveling direction is equal to the rear region of the basic error range in the vehicle traveling direction. In general, the basic error range is indicated by a circle. In this example, the basic error range is indicated by an ellipse whose long axis extends along a direction in which a road extends. When the adjustment amount ΔD is input, the center P of the basic error range is offset from the estimated vehicle position in the vehicle forward direction or the vehicle rearward direction, according to the sign of the adjustment amount ΔD. When the adjustment amount ΔL is input, the basic error range is increased or reduced, according to the sign of the adjustment amount ΔL. In an example shown in FIG. 7B, the adjusted error range is generated by offsetting the basic error range by the adjustment amount ΔD in the vehicle forward direction. In an example shown in FIG. 7C, the adjusted error range is generated by offsetting the basic error range by the adjustment amount ΔD in the vehicle forward direction, and reducing the length of each of the rear region and the front region of the basic error range in the vehicle traveling direction by the adjustment amount ΔL. Thus, the error range of the estimated vehicle position is calculated more accurately, according to a driving situation and a road situation. Particularly, for example, it is possible to calculate the error range required to more accurately extract a set of the reference data in the scene matching, that is, the error range that is accurate and may be small.

Figure 8A:
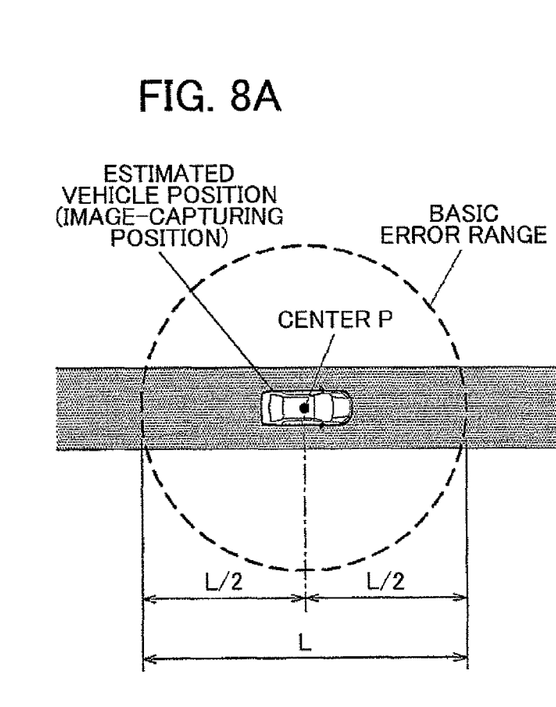
FIGS. 8A to 8C are explanatory diagrams schematically showing adjustment of the basic error range based on the adjustment information in an example different from the example shown in FIGS. 7A to 7C.
Figure 8B:
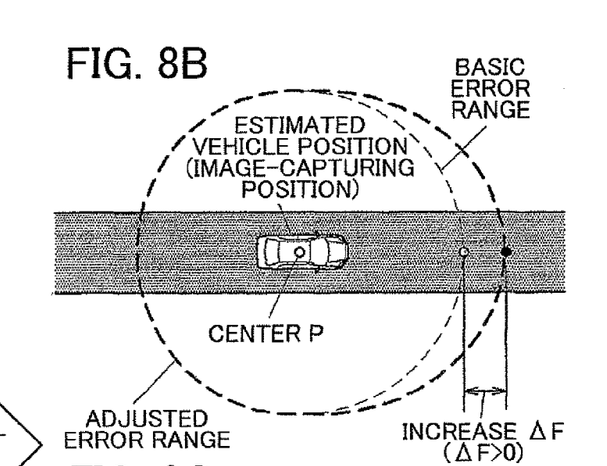
Figure 8C:
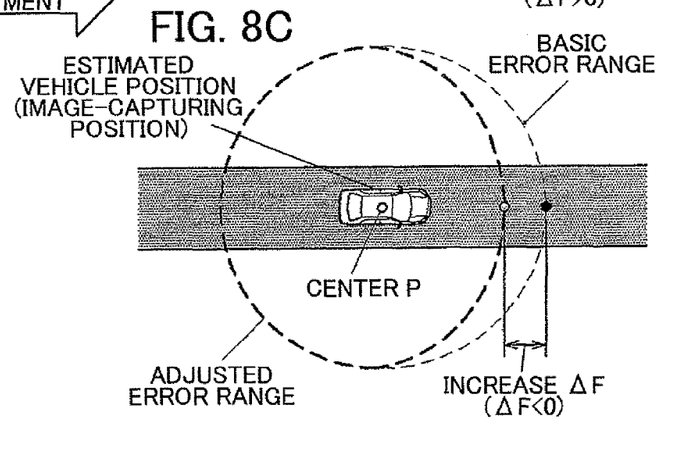

FIGS. 8A to 8C show another embodiment relating to adjustment of the basic error range. In this embodiment, the adjustment amount (the estimated error amount) is divided into a front adjustment amount ΔF for the front region of the basic error range in the vehicle traveling direction, and a rear adjustment amount ΔR for the rear region of the basic error range in the vehicle traveling direction. The front adjustment amount ΔF and the rear adjustment amount ΔR are treated as amounts that are derived by respective functions independently from each other. Namely, the front adjustment amount ΔF is derived by a function F, that is, the front adjustment amount ΔF is represented by the equation, $\Delta F = F(\alpha_1, \alpha_2, \ldots, \alpha_n)$, and the rear adjustment amount ΔR is derived by a function R, that is, the rear adjustment amount ΔR is represented by the equation, $\Delta R = R(\alpha_1, \alpha_2, \ldots, \alpha_n)$. Note that all of the error factor amounts $\alpha_1$ to $\alpha_n$, are not necessarily used as variables in each of the functions F and R. Unnecessary variable(s) is(are) substantially omitted by making a coefficient(s) for the variable(s) 0. Further, various error factor amounts may be optimally used by appropriately setting the coefficients for the variables. When appropriately setting the coefficients for the variables, the signs of the coefficients may be appropriately set. The coefficient may be a power of the variable. In FIGS. 8B and 8C, only examples of the front adjustment amount ΔF are shown. However, each of the front adjustment amount ΔF and the rear adjustment amount ΔR has a positive sign or a negative sign. When the front adjustment amount ΔF is a positive amount, the front adjustment amount ΔF indicates that the front region of the basic error range is increased, and when the front adjustment amount ΔF is a negative amount, the front adjustment amount ΔF indicates that the front region of the basic error range is reduced. When the rear adjustment amount ΔR is a positive amount, the rear adjustment amount ΔR indicates that the rear region of the basic error range is increased, and when the rear adjustment amount ΔR is a negative amount, the rear adjustment amount ΔR indicates that the rear region of the basic error range is reduced. In this embodiment, the shape of the basic error range is a circle as shown in FIG. 8A, and the shapes of the adjusted error ranges are distorted circles as shown in FIGS. 8B and 8C. However, each of the shape of the basic error range and the shape of the adjusted error range is not limited to a circle (a distorted circle) or an ellipse. For example, each of the shape of the basic error range and the shape of the adjusted error range may be a rectangle or other shapes.

When the vehicle is traveling on a road, an error caused in the vehicle forward direction or the vehicle rearward direction is particularly important. In the above-described embodiments, the amount of deviation in the vehicle forward direction or the vehicle rearward direction is calculated as the estimated error amount, taking into account whether each error factor tends to cause an error in the vehicle forward direction or an error in the vehicle rearward direction. Accordingly, it is possible to adjust the basic error range based on the estimated error amount thus calculated.

When there is a plurality of the directional error factors, it is preferable that a plurality of the estimated error amounts may be calculated based on the plurality of the different directional error factors, the sum of the plurality of the estimated error amounts may be calculated, and the basic error range may be adjusted based on the sum. The sum of the plurality of the estimated error amounts is a value according to the directions in which errors tend to be caused by the plurality of the directional error factors. That is, a total estimated error amount based on the plurality of the directional error factors is indicated by the sum with a sign. Therefore, it is possible to suppress an unnecessary increase of the error range.

In the above-described embodiments, when the basic error range is adjusted, the surrounding information obtaining range for obtaining the information regarding the surrounding region around the estimated vehicle position is determined based on the adjusted error range. When the surrounding region around the vehicle position is determined, the information associated with the surrounding region, that is, so-called surrounding information can be used in various manners. In the above-described embodiments, the error range that is more accurate than an error range in related art is used as the range for obtaining the surrounding information.

Thus, it is possible to use the surrounding information obtained with pinpoint accuracy.

Examples of the surrounding information include the reference data for the scene matching, which is generated from the captured image obtained by capturing an image of a scene viewed from the vehicle. The scene matching between the captured image obtained by capturing an image of a scene at the time point and the reference images associated with accurate vehicle positions is a useful technology for accurately determining the vehicle position. When the scene matching is performed, it is effective to use the accurate error range for setting the reference data extraction range (the search condition) used to reduce the amount of the reference data that serve as the matching candidates for the captured image.

It is preferable to adjust the above-described basic error range by offsetting the center of the basic error range from the estimated vehicle position in the vehicle traveling direction, as in the above-described embodiments. In this case, it is possible to easily incorporate the invention into a conventional system, while using the conventional algorithm for calculating the basic error range. Also, it is preferable to adjust at least one of the front region and the rear region of the basic error range in the vehicle traveling direction. In this case, it is possible to calculate the error range that is more accurate and smaller, and to provide the useful vehicle position recognition system.

Among the error factors, there are error factors that cause errors regardless of the vehicle traveling direction, for example, error factors that randomly cause measurement errors. Taking into account such non-directional error factors as well is important for calculating the error range that is highly reliable. Therefore, it is preferable that the estimated error amount regarding at least one non-directional error factor may be calculated, and the front region and the rear region of the basic error range in the vehicle traveling direction may be evenly adjusted based on the estimated error amount, as in the above-described embodiments. By combining the adjustment of the basic error range based on the non-directional error factor(s) and the adjustment of the basic error range based on the directional error factor(s), it is possible to calculate the highly reliable error range. As in the above-described embodiments, a module or a unit (the error calculation module 7) that serves as the first estimated error amount calculation unit to calculate estimated error amount regarding at least one directional error factor may also serve as the second estimated error amount calculation unit to calculate estimated error amount regarding at least one non-directional error factor.

It is preferable that the directional error factor may include at least one of a conversion error due to conversion from three-dimensional data regarding a slope road to two-dimensional data, a travel distance error due to travel in a zigzag manner within a road width, a travel distance error due to tire slip, and a travel distance error due to pulse missing in a pulse detection type distance sensor. The directional error factors can be relatively easily quantified based on the sensor signals, and the influences of the errors are large. Thus, when the basic error range is adjusted taking into account the directional error factor(s), the effect of adjustment is high.

In the above-described embodiment, among the edge points obtained as the image feature points through the edge detection processing, particularly, the line segment edge points (the straight line component edge points) that constitute one line segment, and the corner edge point (the intersection edge point) are treated as the useful image feature points. The corner edge point (the intersection edge point) corresponds to the intersection at which the line segments intersect with each other, preferably, the line segments are substantially orthogonal to each other. The matching performing unit 64 employs an algorithm for ordinary pattern matching. However, the matching performing unit 64 may employ an algorithm for weighted pattern matching in which when the corner edge points, which have a high importance degree in the scenic image, match each other, a high matching evaluation is provided as compared to when the other edge points match each other (i.e., when the edge points, which are not the corner edge points, match each other). In this case, it is preferable that the reference data DB 92 may be created using the reference data including a corner attribute that shows the coordinates of the corner edge point. Alternatively, the corner edge point may be detected each time the reference data is extracted. During the process of generating the data for matching from the actually-captured image, an identification label may be assigned to the corner edge point in the data for matching.

The image feature points used in the invention are not limited to the line segment edge point and the corner edge point. The image feature points useful for a scene may be used. For example, the typical edge points that form a geometric shape, such as a circle and a rectangle, may be used (when the geometric shape is a circle, the typical edge points may be three points on the circumference of the circle), or the gravity center of a geometric shape or a point indicating the gravity center of the geometric shape in the image may be used. Also, it is preferable to employ an edge intensity as a factor used for calculating the importance degree. For example, when a line segment is composed of an edge with a high intensity, the starting point and the ending point of the line segment may be treated as the image feature points to which a high importance degree is assigned, as compared to an importance degree assigned to the edge points other than the starting point and the ending point. Also, specific points in a characteristic geometric shape, for example, end points in a symmetrical object may be treated as the image feature points to which a high importance degree is assigned, as compared to an importance degree assigned to the edge points other than the end points.

Further, in addition to the edge points obtained through the edge detection processing, a point at which a hue and/or a chroma greatly change(s) in the captured image may be employed as the image feature point. Similarly, as the image feature point based on color information, the end point of an object with a high color temperature may be treated as the image feature point with a high importance degree.

That is, any image feature points may be used in the embodiment of the invention, as long as the image feature points are useful for the determination as to the degree of similarity between the reference data and the image feature point data generated based on the actually-captured image, for example, the pattern matching.

In the above-described embodiment, the reference data stored in the reference data DB 92 is associated with the image-capturing position and the image-capturing direction (the direction of the optical axis of the camera). The reference data may be associated with the above-described image-capturing situation information, a date on which the image is captured, a weather at the time of image capturing, and the like, in addition to the image-capturing position and the image-capturing direction.

The image-capturing position needs to be indicated by at least two-dimensional data such as data including the latitude and the longitude. The image-capturing position may be indicated by three-dimensional data including the latitude, the longitude, and the altitude.

The image-capturing direction does not necessarily need to be associated with the reference data. For example, in the case where it is ensured that when the reference data is created, the image is captured in a direction with respect to a road on which the vehicle is traveling, which is substantially the same as a direction in which the image is captured when the scenic image recognition is performed using the reference data, the image-capturing direction does not need to be associated with the reference data.

In the case where the image-capturing direction is associated with the reference data, and a plurality of reference data may be prepared by appropriately changing the image-capturing direction from one basic image-capturing direction, the direction in which the vehicle is traveling may be calculated based on information transmitted from the direction sensor and the like, and only the reference data, whose image-capturing direction coincides with the direction in which the vehicle is traveling, may be used for the scenic image recognition.

The most appropriate vehicle-mounted camera used in the embodiment of the invention is a camera that captures an image of a scene ahead of the vehicle in the direction in which the vehicle is traveling. However, the vehicle-mounted camera may be a camera that captures an image of a scene at a position obliquely ahead of the vehicle, or a camera that captures an image of a scene behind the vehicle. When using a rear camera that captures an image of a scene behind the vehicle, a direction in which the image feature points move during travel of the vehicle is opposite to a direction in which the image feature points move during travel of the vehicle when using a front camera. Therefore, when the image feature points are concentrated on a peripheral area, a reference point is offset forward, instead of offsetting the reference point rearward. When the image feature points are concentrated on a center area, the reference point is offset rearward, instead of offsetting the reference point forward. That is, because each of the front camera and the rear camera may be used, the captured image used in the invention is not limited to the captured image obtained by capturing an image of a scene ahead of the vehicle in the vehicle traveling direction.

In the functional block diagram used to describe the above embodiment, the functional units are separated from each other so that the description is easily understandable. However, the invention is not limited to the case where the functional units are separated from each other as shown in the functional block diagram. At least two of the functional units may be freely combined with each other, and/or one functional unit may be further divided.

The image processing system according to the embodiment of the invention may be applied not only to car navigation, but also to a technical field in which the current position and the current direction are measured through the scenic image recognition.

What is claimed is:

1. A vehicle position recognition system comprising:
a vehicle position calculation unit that calculates an estimated position of a vehicle based on satellite positioning and dead reckoning navigation;
an error range calculation unit that calculates a basic error range, wherein there is a possibility that the vehicle exists in the basic error range;
a first estimated error amount calculation unit that calculates at least one first estimated error amount regarding at least one directional error factor, wherein the at least one directional error factor is at least one error factor that tends to cause at least one error in at least one specific direction with respect to a vehicle traveling direction, and the at least one first estimated error amount is at least one estimated amount of the at least one error that is caused by the at least one directional error factor;
a first error range adjustment unit that adjusts the basic error range based on at least one direction in which the at least one error tends to be caused by the at least one directional error factor, and the at least one first estimated error amount; and
a surrounding information obtaining range determination unit that determines a surrounding information obtaining range based on the adjusted error range, the surrounding information obtaining range being used for obtaining reference data for scene matching regarding a surrounding region around the estimated position, the reference data for scene matching being used when scenic image recognition is performed based on a captured image obtained by capturing an image of a scene viewed from the vehicle;
wherein the surrounding information obtaining range determined by the surrounding information obtaining range determination unit is used as an extraction range for extracting the reference data from a database, when a position of the vehicle is determined through matching between the reference data and data for matching, which is generated from an actually-captured image obtained by capturing an image of a scene using a vehicle-mounted camera.

2. The vehicle position recognition system according to claim 1, wherein
the first estimated error amount calculation unit calculates a plurality of the first estimated error amounts based on a plurality of the different directional error factors, and calculates a sum of the plurality of the first estimated error amounts, the sum according to the directions in which errors tend to be caused by the plurality of the directional error factors; and
the first error range adjustment unit adjusts the basic error range based on the sum.

3. The vehicle position recognition system according to claim 1, wherein
the first error range adjustment unit adjusts the basic error range by offsetting a center of the basic error range from the estimated position in the vehicle traveling direction.

4. The vehicle position recognition system according to claim 1, wherein
the first error range adjustment unit adjusts at least one of a front region and a rear region of the basic error range in the vehicle traveling direction.

5. The vehicle position recognition system according to claim 1, wherein
the at least one directional error factor includes at least one of a conversion error due to conversion from three-dimensional data regarding a slope road to two-dimensional data, a travel distance error due to travel in a zigzag manner within a road width, a travel distance error due to tire slip, and a travel distance error due to pulse missing in a pulse detection type distance sensor.

6. A vehicle position recognition system comprising:
a vehicle position calculation unit that calculates an estimated position of a vehicle based on satellite positioning and dead reckoning navigation;
an error range calculation unit that calculates a basic error range, wherein there is a possibility that the vehicle exists in the basic error range;
a first estimated error amount calculation unit that calculates at least one first estimated error amount regarding at least one directional error factor, wherein the at least one directional error factor is at least one error factor that tends to cause at least one error in at least one specific direction with respect to a vehicle traveling direction, and the at least one first estimated error amount is at least one estimated amount of the at least one error that is caused by the at least one directional error factor; and a first error range adjustment unit that adjusts the basic error range based on at least one direction in which the at least one error tends to be caused by the at least one directional error factor, and the at least one first estimated error amount;

a second estimated error amount calculation unit that calculates at least one second estimated error amount regarding at least one non-directional error factor, wherein at least one non-directional error factor is at least one error factor that causes at least one error regardless of the vehicle traveling direction, and the at least one second estimated error amount is at least one estimated amount of the at least one error that is caused by the at least one non-directional error factor; and a second error range adjustment unit that evenly adjusts a front region and a rear region of the basic error range in the vehicle traveling direction, based on the at least one second estimated error amount.

* * * * *